(12) United States Patent
Smits et al.

(10) Patent No.: US 11,974,585 B2
(45) Date of Patent: May 7, 2024

(54) METHOD OF BEVERAGE EXTRACTION

(71) Applicant: Koninklijke Douwe Egberts B.V., Utrecht (NL)

(72) Inventors: Joannes Hubertus Petrus Maria Smits, Utrecht (NL); Stijn Jumelet, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 411 days.

(21) Appl. No.: 17/251,175

(22) PCT Filed: Jun. 13, 2019

(86) PCT No.: PCT/EP2019/065613
§ 371 (c)(1),
(2) Date: Dec. 10, 2020

(87) PCT Pub. No.: WO2019/243173
PCT Pub. Date: Dec. 26, 2019

(65) Prior Publication Data
US 2021/0259272 A1    Aug. 26, 2021

(30) Foreign Application Priority Data
Jun. 20, 2018   (GB) .................................. 1810116

(51) Int. Cl.
*A23F 3/26*      (2006.01)
*A23F 5/26*      (2006.01)
(Continued)

(52) U.S. Cl.
CPC .............. *A23F 5/262* (2013.01); *A47J 31/002* (2013.01); *A47J 31/56* (2013.01)

(58) Field of Classification Search
CPC .......... A23F 5/262; A47J 31/002; A47J 31/56
See application file for complete search history.

(56) References Cited

U.S. PATENT DOCUMENTS 2,155,971 A  *  4/1939  Houseman .............. A23F 5/267
                                                99/290
2,420,615 A     5/1947  Palmer
(Continued)

FOREIGN PATENT DOCUMENTS

CN         106035921        10/2016
EP           0209937    *    1/1987
(Continued)

OTHER PUBLICATIONS

Translation for JP2012165763 published Sep. 2012.*
(Continued)

*Primary Examiner* — Anthony J Weier
(74) *Attorney, Agent, or Firm* — Fitch, Even, Tabin & Flannery LLP (57) ABSTRACT

The invention provides a method of extracting a beverage material including the steps of a) at least partially filling a first extraction chamber with an extractable beverage material; b) conveying at least one extraction fluid through at least said first extraction chamber to provide an extract; c) modifying said extraction fluid temperature before conveying extraction fluid through at least said first extraction chamber at a second extraction temperature to provide a secondary extract. The invention further provides an apparatus for preparing a beverage.

20 Claims, 5 Drawing Sheets

(51) Int. Cl.
*A47J 31/00* (2006.01)
*A47J 31/56* (2006.01)

(56) References Cited

U.S. PATENT DOCUMENTS

| | | | | |
|---|---|---|---|---|
| 2,888,349 | A * | 5/1959 | Morrow | A23F 5/262 426/434 |
| 2,915,399 | A * | 12/1959 | Guggenheim | A23F 5/262 426/434 |
| 2,915,403 | A * | 12/1959 | Clinton | A23F 5/262 426/434 |
| 2,949,364 | A * | 8/1960 | Bilenker | A23F 5/265 426/434 |
| 3,089,772 | A * | 5/1963 | Bowden | A23F 5/262 426/434 |
| 3,092,498 | A * | 6/1963 | White | A23F 5/483 426/430 |
| 3,208,369 | A * | 9/1965 | Greenly | A47J 31/408 210/387 |
| 3,224,879 | A * | 12/1965 | Di Nardo | A23F 5/267 426/594 |
| 3,451,823 | A * | 6/1969 | Mishkin | A23F 5/26 426/387 |
| 3,607,280 | A * | 9/1971 | Durchholz | A23F 5/262 426/434 |
| 3,655,398 | A * | 4/1972 | Pitchon | A23F 5/262 426/434 |
| 3,700,466 | A | 10/1972 | Bergeron | |
| 3,720,518 | A * | 3/1973 | Gallo et al. | A23F 5/262 426/387 |
| 3,790,689 | A * | 2/1974 | Pitchon et al. | A23F 5/262 426/434 |
| 3,830,940 | A * | 8/1974 | Sivetz | A23F 5/262 426/433 |
| 3,928,636 | A | 12/1975 | Katz | |
| 4,088,794 | A * | 5/1978 | Katz | A23F 5/262 426/434 |
| 4,158,067 | A * | 6/1979 | Wouda | A23F 5/265 426/434 |
| 4,707,368 | A * | 11/1987 | Vogel | A23F 5/486 426/434 |
| 5,399,370 | A * | 3/1995 | Hsu | A23F 5/262 426/534 |
| 7,767,246 | B2 * | 8/2010 | Smits | A23F 5/262 426/594 |
| 9,480,359 | B1 * | 11/2016 | Kalenian | A23F 5/262 |
| 2006/0083845 | A1 * | 4/2006 | Smits | A23F 5/285 426/594 |
| 2007/0231443 | A1 * | 10/2007 | Goto | A23F 5/28 426/594 |
| 2014/0079855 | A1 * | 3/2014 | Yokoo | B65D 85/8043 426/432 |
| 2017/0156539 | A1 | 6/2017 | Han | |
| 2018/0000108 | A1 * | 1/2018 | Boggavarapu | A47J 31/5251 |
| 2018/0098658 | A1 * | 4/2018 | Angell | A47J 31/44 |

FOREIGN PATENT DOCUMENTS

| | | |
|---|---|---|
| GB | 877522 | 9/1961 |
| JP | 2011135898 | 7/2011 |
| JP | 2012165763 | 9/2012 |
| JP | 2018068122 | 5/2018 |
| TW | 201309246 | 3/2013 |

OTHER PUBLICATIONS

International Search Report and Written Opinion, dated Sep. 18, 2019; PCT/EP2019/065613 (25 pgs.).

UKIPO; Appl. No. GB1810116.29; Search Report Under Section 17(5) dated Nov. 29, 2018 (4 pgs.).

* cited by examiner

METHOD OF BEVERAGE EXTRACTION

CROSS REFERENCE TO RELATED APPLICATIONS

This application is a U.S. national phase application of International Application No. PCT/EP2019/065613, filed Jun. 13, 2019, which claims priority to GB Appl. No. 1810116.2, filed Jun. 20, 2018, which are hereby incorporated herein by reference in their entireties.

TECHNICAL FIELD OF THE INVENTION

The present invention relates to a method of extraction of an extractable beverage material. The present invention further relates to a beverage extraction apparatus.

BACKGROUND TO THE INVENTION

Interest in coffee beverages using coffee extracts made by cold extraction processes has shown a recent increase, encouraging the coffee industry to focus on the cold extraction and consequently the preparation of coffee beverages to satisfy the market's demand. As a result, innovation has received in recent times a boost towards cold temperature coffee extraction and beverages preparation.

Manufacture of cold temperature coffee extracts is routinely carried out in a 1-stage stirred slurry tank extractor. After extraction, the coffee grounds are separated by means of different technologies such as extruders and/or filters to isolate coarse and fine coffee particles, resulting in valuable coffee extract losses. Furthermore, the application of a stirred slurry tank extractor can result into a low raw material yield, due to the fact that this process may be limited by equilibrium conditions. This issue may be partially compensated by the application of high water-to-coffee ratios, but this can lead to a lower soluble solids content. In addition, the use of a 1-stage stirred slurry tank extractor can affect acrylamide and caffeine content/level, due to the low raw material yield.

To mitigate low extraction yield, a series of stirred slurry tank extractors can be applied in a counter current operation, but one drawback is that this process involves coffee grounds separation at each stage, increasing process costs.

Alternative processes might include down flow percolator extraction systems where water may flow in the direction of gravity. For these kinds of systems, potential flooding and creation of water preferential channels (short-cuts/by-passes) could lead to a poor extraction yield. Furthermore, in these systems the control of the presence of air pockets inside the roast and ground coffee bed might be difficult, affecting the yield result.

Finally, open extraction systems such as belt filter extractors or double screw continuous extractors can be used to produce cold coffee beverages. In such apparatus roast and ground coffee particles are in direct contact with air which results in aroma loss and poor extract quality.

These known apparatuses for the production of cold coffee extracts suitable for the preparation of cold coffee beverages as discussed above have a number of disadvantages including adding complexity to the system. For example, they lead to the necessity of the coffee grounds to be separated at each stage, resulting in valuable coffee loss and consequently in the process being relatively expensive. These apparatuses may moreover present cleaning difficulties, as the coffee grounds extracted at low temperature maintain a hard consistency which can make it more difficult to discharge them from the column once the extraction has been performed. In addition to these drawbacks, the poor extraction yield of these known apparatuses can involve further additional costs due to the large amount of roast and ground coffee that needs to be extracted to obtain an appropriate concentration for the production of cold coffee beverages, due to the large amount of energy needed to concentrate a diluted extract.

In this context, the ability to provide an industrial extraction process of roast and ground coffee under ambient conditions or temperature lower than 30° C., especially lower than 25° C., which allows a higher extraction yield and reduces production costs and system complexity, would be advantageous.

It would be furthermore advantageous to provide an industrial extraction process in which the additional separation of coarse and fine coffee particles is not needed.

It would be furthermore advantageous to provide an industrial extraction process in which equilibrium conditions may not be reached and extraction phase is not limited so that a higher yield can be achieved.

It would be also advantageous to provide an industrial extraction process in which a higher quality level of the coffee extract (with a lower content of acrylamide and caffeine) may be achieved.

It would be advantageous to provide an industrial extraction process in which ground coffee bed may act as a natural sieve/filter to separate coarse and fine particles (and stops fine particles to reaching upper filter and, therefore, clogging or blockage of the upper outlet of the column).

It would also be advantageous to provide an industrial extraction process in which the air displacement is facilitated by the percolator's position.

It would be further advantageous to provide an industrial extraction process in which a further increase of soluble solids content of the extract may be achieved through at least a partial recirculation of the cold coffee extract itself.

It would be furthermore advantageous to provide an industrial extraction process in which the potential residual raw materials yield may be released from the coffee by means of a secondary extraction pursued after the cold coffee extraction.

It would be advantageous to provide an industrial extraction process in which an easier discharge of the column after use may be achieved.

It would be finally advantageous to provide an industrial cold extraction process which could supply product on a global scale (with a global scale capability).

It is therefore an aim of embodiments of the invention to satisfy the highly-felt need of an optimised industrial extraction process of roast and ground coffee under ambient conditions in a fixed bed percolator and/or to overcome or mitigate at least one problem of the prior art whether disclosed herein or not.

SUMMARY OF THE INVENTION

According to a first aspect of the invention there is provided a method of extracting a beverage material comprising the steps of:
 a) at least partially filling a first extraction chamber with an extractable beverage material;
 b) conveying at least one extraction fluid through at least said first extraction chamber to provide an extract;
 c) modifying said extraction fluid temperature before conveying extraction fluid through at least said first extraction chamber at a second extraction temperature to provide a secondary extract;

In a preferred embodiment before step c) the method further comprises the steps of:
- d) conveying at least partially said extract back into said first extraction chamber to provide an enriched extract; and/or
- e) collecting said enriched extract.

In a further preferred embodiment, the method comprises a step f) of conveying the secondary extract at the second extraction temperature through the first extraction chamber to provide an enriched secondary extract.

In some embodiments steps d) and f) are repeated at least once.

In a more preferred embodiment the first extraction temperature is lower than the second extraction temperature and even more preferably the extract produced in step b) and/or d) has a temperature lower than the extract produced in step c) and/or f).

Furthermore, the first extraction temperature may be in the range of between 10° C. and 35° C., preferably no more than 25° C. and more preferably no more than 23° C. The second extraction temperature is in the range of between 100° C. to 220° C., preferably no more than 170° C.

Furthermore, in more preferred embodiments the water has a fluid flow rate in step b) and/or c) in the range of 18 to 25 Kg/h, preferably 20 kg/h.

In other embodiments, the water in steps d) and/or f) has a fluid flow rate of in the range of 10 to 20 Kg/h, preferably 18 kg/h.

In some embodiments, the ratio of the extraction fluid conveyed through the extractable beverage material to extractable beverage material may be in the range of 2.5 to 6.

According to a second aspect of the invention there is provided a method of extracting a beverage material comprising the steps of:
- a) at least partially filling a first extraction chamber with an extractable beverage material;
- b) conveying at least one extraction fluid at a first extraction temperature through the extractable beverage material in the first extraction chamber to provide an extract;
- c) conveying said extract at the first extraction temperature through at least a second extraction chamber at least partially filled with an extractable beverage material to provide an enriched extract;
- d) modifying said extraction fluid temperature before conveying extraction fluid through the extractable beverage material in the first extraction chamber at a second extraction temperature to provide a secondary extract;

In a preferred embodiment, the method further comprises a step e) of conveying the secondary extract at the second extraction temperature through at least the second extraction chamber to provide an enriched secondary extract.

In a more preferred embodiment the first extraction temperature is lower than the second extraction temperature.

In some embodiments, the extract produced in step b) and/or c) has a temperature lower than the extract produced in step d) and/or e).

Furthermore, the first extraction temperature may be in the range of between 10° C. and 35° C., preferably no more than 25° C. and more preferably no more than 23° C.

The second extraction temperature may be in the range of between 100° C. to 220° C., preferably no more than 170° C.

In some embodiments, steps b) and/or c) are repeated at least once before step d) is performed.

In another embodiment steps b) and/or c) are repeated at least twice before step d) is performed.

Preferably the ratio of the partially recirculated extract at the first temperature after step b) to the extraction fluid is in the range of 1 to 10, preferably 4 to 6.

In some embodiments, step d) is repeated at least once.

In a more preferred embodiment, the extraction chamber comprises a column and more preferably all the extraction chambers comprise columns. Suitably, the columns are loaded from the top of the column or proximal to the top of the column and preferably filled with the extractable beverage material substantially up to the top of the column, or up to 90%, 95%, 96%, 97%, 98% or up to 99% of height of the column.

In some embodiments, there are between 2 and 12 extraction chambers or columns, preferably between 4 and 8 and most preferably 5 or 6. More preferably the series of extraction chambers or columns are operated in multiple cycles.

In other embodiments, the method further comprises a step after step c) of conveying the enriched extract through at least a third extraction chamber at least partially filled with a extractable beverage material.

In another embodiment, the extract of step b) is conveyed through the third and each of all the subsequent extraction chambers.

In more preferred embodiments step d) is repeated once.

In some embodiments, all the extraction chambers comprise columns.

In a further embodiment, after performing steps a), b), c) and d) at least once, fresh extraction fluid is added to the extract produced by at least one of the steps a), b), c) and d).

In some embodiments, fresh extraction fluid is added to the relevant extract coming from step b) and/or c) and/or d), which fresh extraction fluid may act as a diluent. Preferably the extract to said added fresh extraction fluid ratio is in the range between 0% and 100%, preferably between 5% and 90% and most preferably 1% to 75%, preferably 50%.

In some embodiments, the method may comprise a further step f) of emptying the first extraction column of extractable beverage material after step d) or e).

In some embodiments, the method further comprises the steps of:
- g) loading said emptied column with fresh extractable beverage material; and
- h) providing said extractable beverage material with said enriched extract at the first extraction temperature.

In a preferred embodiment, the enriched extract may be diluted before step h).

Further in some embodiments, after step b) at least some of the extract is recirculated back to the first extraction chamber at the first extraction temperature before moving to step c).

In other embodiments, after step c) the enriched extract is at least partially recirculated through each of the subsequent extraction chambers.

Furthermore, in more preferred embodiments the water has a fluid flow rate in step b) and/or c) in the range of 18 to 25 Kg/h, preferably 20 kg/h.

In other embodiments, the water in step e) and/or d) has a fluid flow rate of in the range of 10 to 20 Kg/h, preferably 18 kg/h.

The following statements may be applied to both the first and second aspect of the invention.

In some embodiments, the extraction chamber may comprise a column.

In some preferred embodiments, the extractable beverage material may be coffee or tea and the extraction fluid may comprise water or an aqueous medium.

In some embodiments, the extractable beverage material may comprise a material in the form of a powder, leaves, granules, fragments, or ground material, for example. More preferably, the extractable beverage material comprises roast and ground coffee, green coffee, tea leaves, cocoa, chicory, oat. Even more preferably, the roast and ground coffee may comprise an average particle size distribution value in the range of 1.5-0.2 mm, preferably around 0.8 mm.

In some embodiments, the extraction fluid is conveyed through the extractable beverage material against gravity and the fluid to extractable beverage material ratio may be in the range of 2.5 to 6.

According to a third aspect of the invention there is provided an extraction apparatus comprising:
one or more extraction chambers each configured to retain an extractable beverage material during an extraction process;
an extraction fluid inlet at the bottom of each column configured to introduce an extraction fluid through the extractable beverage material;
an extract outlet at the top of each column configured to remove an extract from the extractable beverage material;
and wherein the apparatus further comprises a heating element configured to independently modify the temperature of at least some of the extraction fluid passing through each extraction chambers.

In a preferred embodiment, the extractable beverage material to be received within each chamber may be at least partially configured as a fixed bed and the apparatus comprises a fixed bed percolator, preferably a counter current fixed bed percolator.

Preferably the fixed bed percolator comprises a semi-continuous fixed bed percolator.

In some embodiments, the heating element may comprise a heating device selected from band heaters, coil heaters, cast-in heaters, flanged immersion heaters, circulation heaters or cartridge heaters, and bolt heaters, for example.

In addition, the heating element may be configured to convey the heated extraction fluid directly to the extraction fluid inlet through one or more pipes conduits.

The apparatus may further comprise one or more cooling elements, preferably applied to the external wall(s) of the extraction chambers, such as a cooling water jacket, for example.

According to a fourth aspect of the invention there is provided a method of extracting a beverage material comprising the steps of filling a first extraction chamber with an extractable beverage material; conveying at least one extraction fluid at a first extraction temperature through the extractable beverage material in the first extraction chamber to provide an extract; conveying said extract at the first extraction temperature through at least a second extraction chamber at least partially filled with an extractable beverage material to provide an enriched extract; and modifying said extraction fluid temperature before conveying further extraction fluid through the extractable beverage material in the first extraction chamber at a second extraction temperature to provide a secondary extract; using an apparatus of the third aspect of the invention.

BRIEF DESCRIPTION OF THE DRAWINGS

In order that the invention may be more clearly understood, embodiments thereof will now be described, by way of example only, with reference to the accompanying drawings of which.

DETAILED DESCRIPTION OF THE INVENTION

Referring to the Figures, like numbers represent like components.

Figure 1:
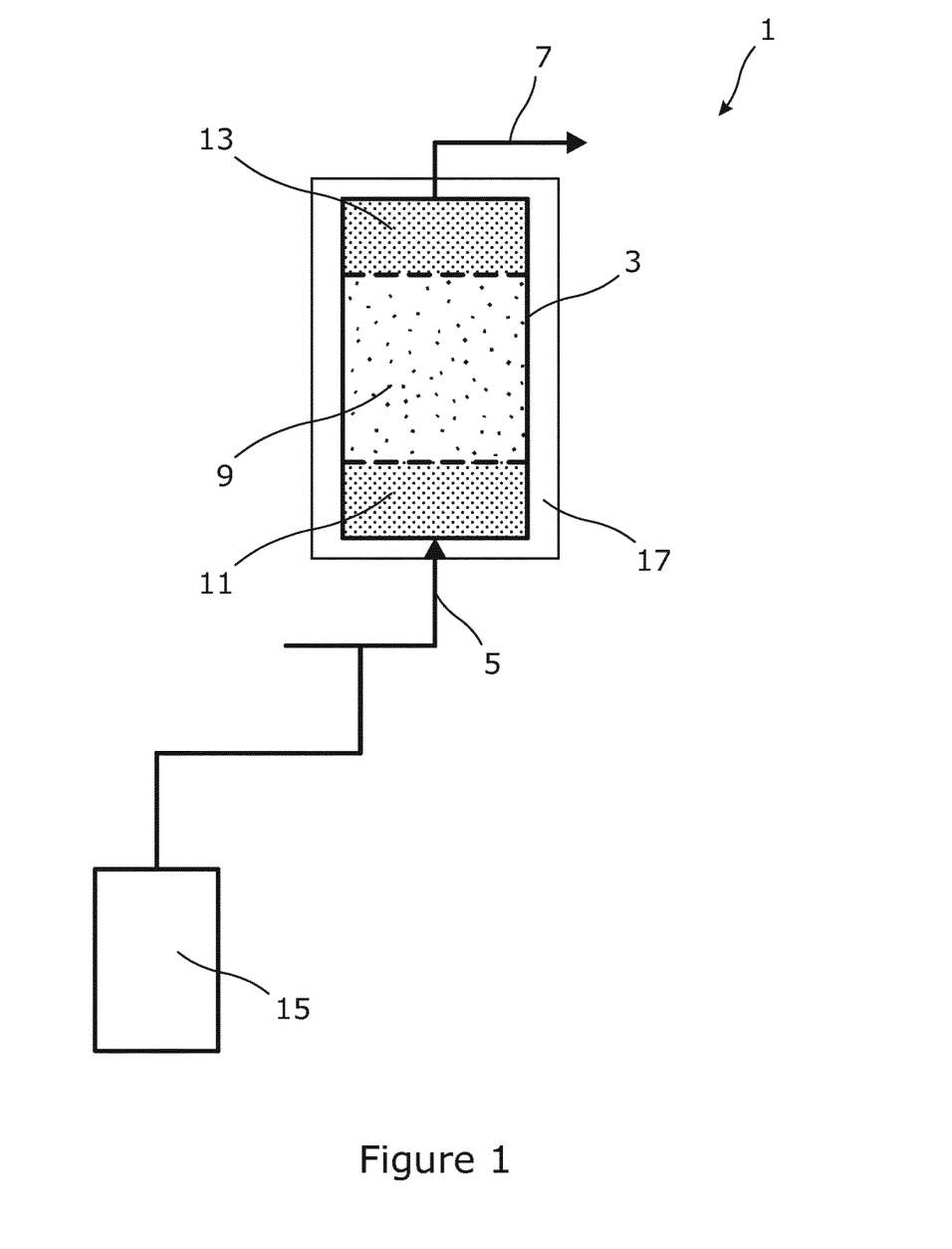
FIG. 1 illustrates a schematic diagram of an apparatus of the invention with a single extraction chamber configuration according to the invention.

Referring firstly to FIG. 1, a schematic diagram of an embodiment of an apparatus (1) of the invention with a single extraction chamber (3) according to the invention is shown.

The apparatus (1) comprises the single extraction chamber (3) in the form of a column. The extraction chamber (3) is connected at its lower area (11) to an extraction fluid inlet (5), through a state of the art pipes system (not shown). The extraction chamber (3) is filled with an extractable beverage material (9) to be perfused with an extraction fluid (not shown) to obtain an extract (not shown). An upper area (13) of the extraction chamber (3) is connected to an extract outlet (7) which enables transport of the extract to further processing steps (not shown). The extraction fluid inlet (5) is connected to an external heating device (15). The extractable beverage material (9) is laid inside the single extraction chamber (3) in a fixed bed configuration. In some embodiments, the extraction chamber (3) is equipped with an external cooling water jacket (17). The lower area (11) and upper area (13) of the single extraction chamber (3) are filled with extractable beverage material which is always extractable during the extraction process and therefore can be considered as part of the extractable material itself (9).

The apparatus (1) is used in an embodiment of the methods of the invention as follows. Fresh extraction fluid (not shown) is sent through a pipes system in a counter current modality to the extraction fluid inlet (5) at a first extraction temperature not higher than 23° C. and preferably ambient temperature. The extraction fluid can consist of water or any other suitable fluid adapted to perform an extraction of the extractable beverage material (9). The extraction fluid passing through the extractable beverage material (9) travels through the extraction chamber (3) to extract soluble solids (not shown), volatile aroma compounds (VOCs, not shown) and all other compounds which are soluble in that specific fluid, contributing to the generation of an extract which is then conveyed and sent to further industrial processes (concentration and/or dilution and/or spray or freeze drying etc.) through the extract outlet (7) positioned at the upper area (13) of the extraction chamber (3). The extraction performed in the single extraction chamber (7) is carried out at a pressure in a range between 0 and 1 bar, where in particular the pressure at the lower area (11) is higher than the pressure at the upper area (13) of the extraction column (3). The extraction fluid is sent to the extraction chamber (3) at a flow rate of 18 to 25 Kg/h. The extractable beverage material (9) consists of roast and ground coffee with a grind size in the range of 0.8 and 1.4 mm, but other grind sizes can be considered. The water to roast and ground coffee ratio is in the range of 4 to 6. The cycle time (time of residency of an extraction fluid inside an extraction chamber to perform an extraction) is around 0.75 hours.

After the first extraction process at 23° C., fresh extraction fluid (not shown) is set at a second extraction temperature, approximately 170° C., through the heating element (15), and the fresh extraction fluid is sent to the extraction fluid inlet (5), through the pipes system. The fresh extraction fluid consists of water or any other suitable fluid adapt to perform an extraction of the extractable beverage material (9). The extraction fluid passes through the partially extracted extractable beverage material (9) performing a further and more exhaustive extraction through the extraction chamber (3), thereby generating a secondary extract (not shown), which is then sent to further processes through the extract outlet (7) positioned at the upper area (13) of the extraction chamber (3). The extraction is performed at a pressure in a range between 0 and 1 bar, where the pressure at the lower area (11) of the extraction chamber (3) is around 1 bar higher than the atmospheric pressure while the pressure at the upper area (13) of the extraction column (3) is at atmospheric pressure. The cycle time is around 0.5 hours. The yield of the extraction carried out at lower temperature as per FIG. 1 is lower than the yield of the process conducted at higher temperature, and it is respectively 18% and 25%.

After the second extraction at 170° C. the spent extractable beverage material is discharged from the extraction chamber (3) and the chamber (3) is refilled with fresh extractable beverage material (not shown).

In a further embodiment (not shown), the extract coming from the extraction at the first temperature (no more than 23° C.) can be at least partially recirculated through a common pipes system to the extraction fluid inlet (5) to perform a further extraction of the same extractable beverage material (9) and generate a partially recirculated extract at the first temperature, while a part of it can be collected and/or conveyed to further industrial processes. The partially recirculated extract resulting from the extraction after partial recirculation is then collected. The ratio of the extract before partial recirculation at the first temperature and the fresh extraction fluid may be in the range of 1 to 10, preferably 4 to 6.

In a more preferred embodiment the recirculation can be total, i.e. the entire extract can be subject to a further extraction of the extractable beverage material (9) at the first temperature, preferably without any dilution with fresh extraction fluid (optional Step c) of the second aspect of the invention).

In a single column extraction apparatus, partial and/or total recirculation can take place at the first and/or at second extraction temperatures, i.e. at 23° C. and 170° C., or alternatively it can take place in only one of the two different temperatures.

In embodiments in which the extract is at least partially recirculated by dilution with fresh extraction fluid, this may serve to move the extraction equilibrium conditions and boost the yield towards higher percentages. This partial or total recirculation can be applied to both temperature stages, i.e. on the extract coming from the extraction at 23° C. and the enriched extract coming from the extraction at 170° C.

Figure 2:
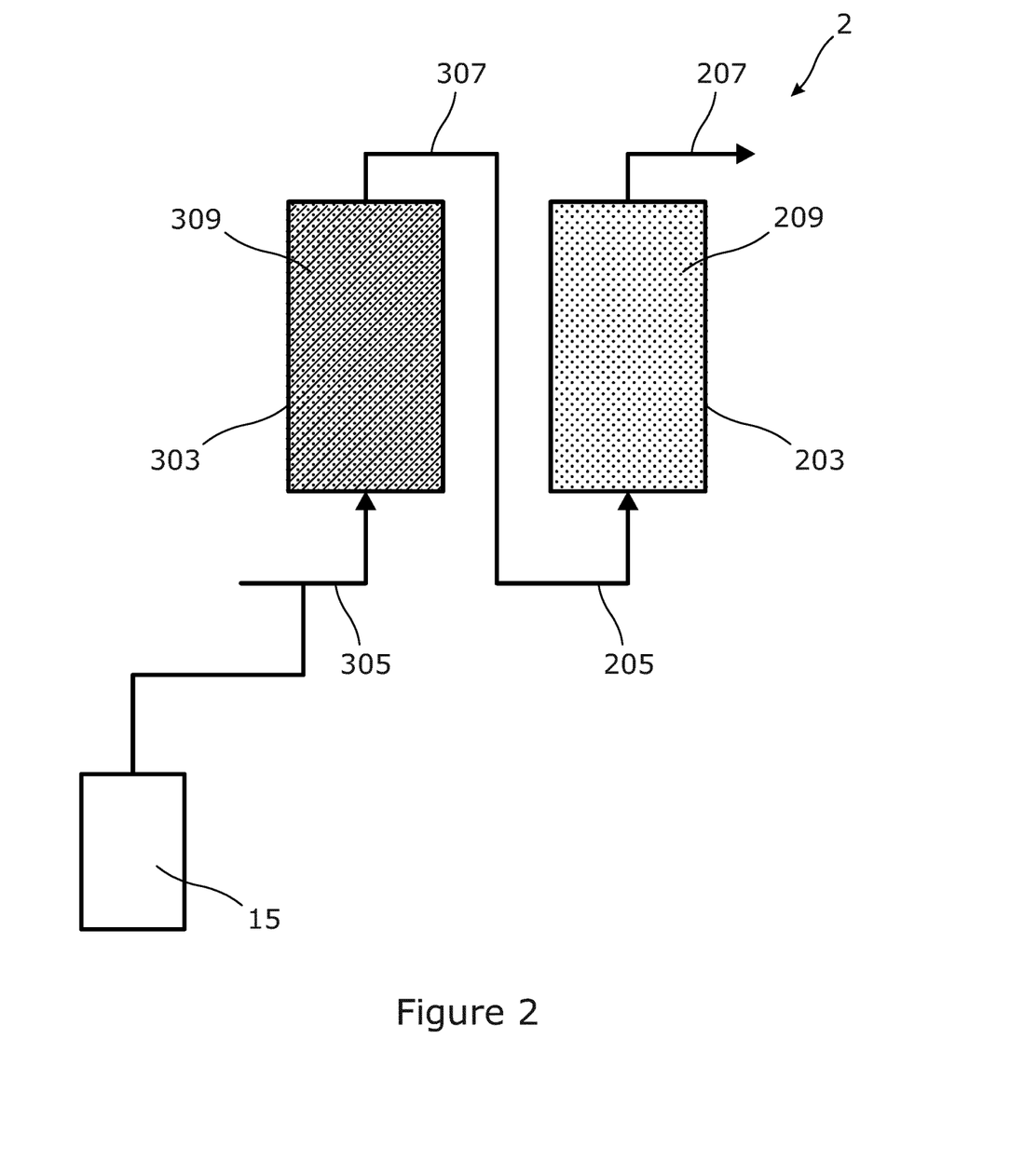
FIG. 2 illustrates a schematic diagram of an apparatus of the invention with multiple extraction chambers.

FIG. 2 is a schematic diagram of an embodiment of an apparatus of the invention with a multiple extraction chambers configuration, for use in the embodiments of the method according to the invention.

An apparatus (2) comprises multiple extraction chambers (303, 203) in the form of columns. A first extraction chamber (303) is connected to a fresh extraction fluid source (not shown) through a state of the art pipes system (not shown). A fresh extraction fluid inlet (305) is connected at a lower portion of the first extraction chamber (303) by a pipes system (not shown), allowing the fresh extraction fluid to access the first extraction chamber (303) and perform the extraction of an extractable beverage material (309) located in it. An extract outlet (307) enables the transportation of an extract (not shown) generated in the first extraction chamber (303) to a second extraction chamber (203). The extract is transported to the second extraction chamber (203) from the lower area of the extraction chamber (203) through an extract inlet (205). An enriched extract outlet (207) is positioned at the upper area of the second extraction chamber (203) to allow a resulting enriched extract (not shown) to exit the second extraction chamber (203).

The apparatus can include further extraction chambers (not shown) which can be connected to each other in a larger sequence/series, which connections can mirror the connections between the first extraction chamber (303) and the second extraction chamber (203). These larger sequence/series can include a number of extraction chambers which can vary from a minimum of two to a maximum of 12 extraction chambers, depending on the scale of the plant in which they are applied.

The apparatus of FIG. 2 is used in embodiments of the methods of the invention, as follows. Fresh extraction fluid is sent through the pipes system to the extraction fluid inlet (305) at a first extraction temperature, not higher than 23° C. and preferably ambient temperature. The extraction fluid may be water or any other fluid suitable to perform an extraction of the extractable beverage material (309). The extraction fluid passing through the extraction fluid inlet (305) reaches the extractable beverage material (309) and travels in counter current through the extraction chamber (303) extracting soluble solids and volatile aroma compounds (VOCs), generating the extract which is then sent to a further extraction process through the extract outlet (307) positioned at the upper area of the extraction chamber (303). The extract is conveyed into the extract inlet (205) of the second extraction chamber (203) and reaches the extractable beverage material (209) therein. The extract passing through the extractable beverage material (209) dissolves soluble compounds contained in the material (209) and generates an enriched extract (not shown) which is transported to the enriched extract outlet (207) to be then collected and sent to further industrial processes, such as concentration and/or dilution and/or spray or freeze drying etc.

The extraction in each of the two extraction chambers (303, 203) is performed at a pressure in a range between 0 and 1 bar, where in particular the pressure at the lower area of the extraction chambers (303, 203) is higher than the pressure at the upper area.

The extraction fluid and the extract are sent to the respective extraction chamber (303, 203) at a flow rate of 18 to 25 Kg/h.

The extractable beverage material (309, 209) inside the two extraction chambers (303, 203) consists of roast and ground coffee with a grind size in the range of 0.8 mm and 1.4 mm, but other grind sizes may be used.

In some embodiments, the extraction process at a first temperature of no more than 23° C. (and preferably ambient temperature) can be performed through a number of extraction chambers higher than 2 (not shown), in a continuous process (not shown). In these embodiments, in use, i.e. when extraction process has started and all the chambers are being fed with extraction fluid, the extractable beverage material loaded in the first chamber of this apparatus is the first to be fed and because the extraction process is continuous, the beverage material in the first chamber corresponds to the most extracted extractable beverage material of the apparatus. In this apparatus, this first chamber is therefore to the first chamber that needs to be discharged when the loaded extractable beverage material is completely exhausted and requires refilling with fresh extractable beverage material. Hence when the first chamber is discharged (and discontinued from the apparatus) the subsequent chamber becomes the new 'first' extraction chamber of the new established apparatus, filled with the most exhausted and extracted extractable beverage material. In this type of continuous apparatus, the first chamber is figuratively moving along the series of chambers of the apparatus as the most extracted chamber is discontinued and the subsequent chamber, loaded with the second most extracted beverage material, becomes the new first chamber of the new configuration of the set of chambers.

Further, in these apparatuses with a set of multiple columns (chambers), in order to increase the performance of the extractable beverage material loaded in the extraction chambers and make it perform in such a way that the same extraction yield percentage by weight is obtained along the entire series of extraction chambers, the extractable beverage material which includes the most exhausted material can be treated with fresh extraction fluid, while the outgoing extract is sent to the subsequent extraction chamber which contains a fresh or a at least less extracted beverage material compared to the one in the previous extraction chamber.

In these embodiments with a series of multiple columns the extractable beverage material contained in two adjacent extraction chambers can be therefore at different levels of extraction performance, when this performance (i.e. the yield, measured in percentage by weight) is measured using the same extraction fluid.

Referring back to FIG. 2 the extraction process through the two extraction chambers (303, 203) can be performed in cycles and that these cycles can be repeated at least once, i.e. the extraction process along the two extraction chambers (203, 303) can be repeated at least once. In this circumstances, the extractable beverage material (309) of the first extraction chamber (303) during the second extraction cycle can present a lower extraction performance, as it comes from a previously performed extraction cycle and the extractable beverage material (309) has already at least partially been extracted, or at least it is more extracted than the extractable beverage material (209) contained in the second extraction chamber (203), which was treated (in the first extraction cycle) with extract coming from the first extraction chamber (303). This extract has a lower extraction power than the extraction power of the fresh extraction fluid sent through the first extraction chamber (303), as it is at least partially saturated in terms of content of soluble solids and VOCs. Therefore in order to increase the extraction performance of the extractable beverage material (309) and make it perform in such a way that the same extraction yield percentage (by wt.) can be obtained along the entire series of extraction chambers (303, 203), the extractable beverage material (309) which represents the most exhausted material, can be treated with fresh extraction fluid coming from the extraction fluid inlet (305), while the outgoing extract is sent to the second extraction chamber (203) which contains a fresher or at least less extracted beverage material (209), compared to the one in the first extraction chamber (309).

In this way the second extraction chamber filled with fresh extractable beverage material (209) and extracted with extract coming from the first extraction chamber (303) will have a similar extraction performance (% by wt.) to the partially exhausted beverage material (309) in the first extraction chamber (303) when fresh extraction fluid is perfused through the partially exhausted extraction beverage material (309).

After having performed at least a first extraction cycle at 23° C. and having obtained the enriched extract, the apparatus is set, through the heating element (15), at a higher temperature and fresh extraction fluid, at a temperature in the range of 100° C. and 220° C. (preferably around 170° C.), is transported to the first extraction chamber (303), filled with the extractable beverage material (309) coming from the first extraction stage at 23° C. and therefore already partially extracted. A secondary extract (not shown) is produced from the first extraction chamber (303) at the second temperature and collected at the top of the chamber (303) to be conveyed through the extract outlet (307) and then the enriched extract inlet (205) to the second extraction chamber (203). The secondary extract reaches the extractable beverage material (209), already partially extracted during the first extraction stage at 23° C., to generate an enriched secondary extract (not shown) which is then send to further industrial processes like concentration and/or dilution and/or spray or freeze drying etc.

In some embodiments (not shown) which comprise a series of extraction chambers with a number of columns higher than 2, the extractable beverage material in each column can be at a different level of extraction performance (yield in percentage by wt.). In these embodiments, the secondary enriched extract obtained by the extraction at 170° C., is conveyed to a further and subsequent extraction chamber filled with extractable beverage material to produce a further secondary enriched extract (not shown). The resulting extract can then be collected to be sent to other industrial processes or to an even further beverage extraction chamber, depending on the level of extract concentration desired.

The extraction cycle performed at around 170° C. can be repeated at least once before sending the secondary enriched extract to further industrial processes.

In some embodiments, after performing the extraction at 170° C., the first extraction chamber is emptied of the extractable beverage material (309) and filled with fresh extractable beverage material (not shown). Then this extraction chamber is to become the less extracted column of a new extraction cycle at 23° C. and is provided with an enriched extract coming from a new extraction cycle at a first extraction temperature (23° C.), ensuring an extraction process in continuous The water and roast and ground coffee ratio is in the range of 4:1 to 6:1. The cycle time (time of residency of the extraction fluid inside the extraction chambers to perform the extraction) is around 0.5 hours.

In some embodiments, the extraction chambers (303, 203) are equipped with an external cooling water jacket (not shown).

In further embodiments, the lower area and upper area (not shown) of the extraction chamber (303, 203) are filled with extractable beverage material (309, 209) which can also be extracted during the extraction process.

In a further embodiment, when a plurality of extraction chambers is used, the total pressure of the entire system can vary in a range between 0-10 bar, depending on grind size of the extractable beverage material, such as roast and ground coffee, the extractable beverage material physical and chemical properties, and the fluid flow rate.

The extraction time, the number of columns and fluid flow rate can depend on the particle size value.

Figure 3:
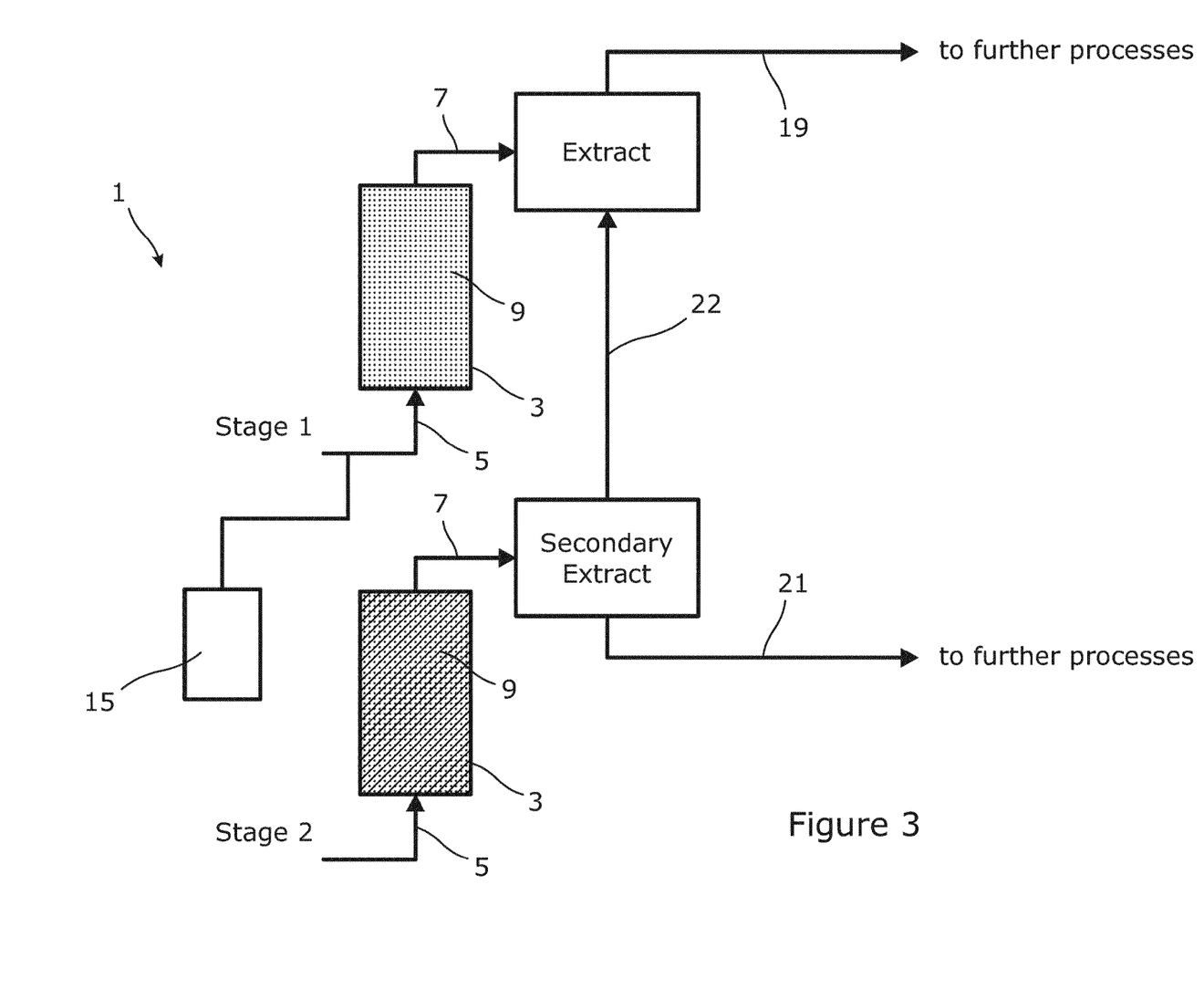
FIG. 3 illustrates a schematic flow diagram utilising an apparatus of the invention with a single extraction chamber configuration set at two different extraction temperatures and showing the possible pathways of the resultant extracts according to the invention.

We refer now to FIG. 3, which is a schematic flow diagram of an embodiment of an apparatus (1) of the invention with a single extraction chamber (3). The apparatus of FIG. 3 is shown in two separate steps of the process at two different extraction temperatures (23° C. firstly and 170° C. secondly), but it will be appreciated that in this embodiment the apparatus comprises a single extraction chamber (3). Resultant extracts (not shown), i.e. extract coming from the extraction at 23° C. (Stage 1) and secondary extract resulting from the increase of temperature at 170° C. (Stage 2), can then be sent to several processes through different pathways (19, 21, 22), through standard system pipes. The pathway chosen will depend on the final product to be obtained and its characteristics. The extraction chamber (3) in the form of a column, is filled with extractable beverage material (9). The column (3) includes an extraction fluid inlet (5) at the lower area of the column (3) and an extraction outlet (7) at the upper area of the column to allow a resulted extract (not shown) to flow out the extraction chamber (3) and reach further industrial processes through the pathways (19, 21, 22). These further processes are not illustrated, but they include concentration processes, dilution, aroma recovery, freeze drying, spray drying and/or packaging (only to mention some of the conventional processes that can take place).

Use of the beverage preparation apparatus (1) of FIG. 3 will now be described. Firstly, fresh extraction fluid (not shown), preferably water, is sent through the extraction fluid inlet (5) to the extraction chamber (3) to extract the extractable beverage material (9) at a temperature of no more than 23° C. (Stage 1). The resulting extract is then sent out through the extraction outlet (7) and collected and retained or sent to further industrial processes. The temperature of the extraction fluid is then adjusted through the heating device (15) in order to reach the final temperature of around 170° C. (Stage 2) and conveyed through the already partially extracted extractable beverage material (9) completing the extraction of beverage material (9) and increasing the final extraction yield (in % wt.) of the operation. The resultant secondary extract (not shown) can then follow two different pathways (21, 22). Through pathway 22, the secondary extract can be at least partially mixed with the extract coming from Stage 1, in order to adjust the extract aroma and/or concentration and then be sent to further processes to produce a customised final product (not shown). Alternatively, through pathways 21, the secondary extract can be sent to further processes to give a final different product ready for selling. The extractable beverage material (9) after being extracted at the higher temperature of 170° C. (Stage 2) results in a softer matrix, which is easily discharged from the extraction chamber (3), which after being emptied is then refilled with fresh extractable beverage material (not shown) and used in fresh extraction processes.

Comparative Example 1 (Prior Art)

Experimental Conditions and Apparatus Set-Up:
Apparatus Configuration: fixed bed single column extractor Coffee blend: 100% *arabica* coffee (*Coffea arabica* L.)
Roasting Degree (Probat Colorette 3B): Medium Roast
Coffee ground size: 0.8 mm
Fines separation (<0.6 mm): yes
Ground coffee load: 19.46 kg
Percolator configuration: single column
Extraction time: 180 min
Feed water temperature: 20° C.
Water to coffee ratio: 10:1
Feed water flow: 18 kg/h
The extraction process of Example 1 therefore consisted of a single extraction at 20° C.

Figure 4:
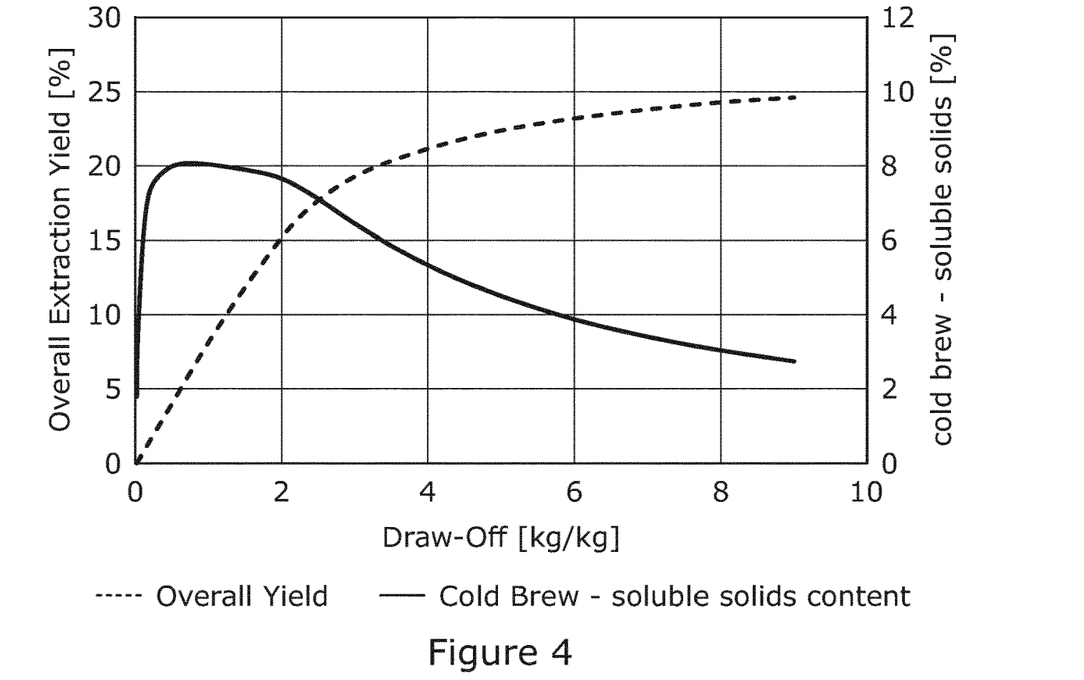
FIG. 4 illustrates a graph of an overall extraction yield (wt. %) and/or an extract soluble solids content (wt. %) plotted against a draw-off value (Kg/Kg) according to Comparative Example 1 using an apparatus and method of the Prior Art.

The graph of FIG. 4 represents an overall extraction yield (wt. %) and/or the extract soluble solids (wt. %) plotted against a draw-off value (mass rate of extract to coffee, Kg/Kg) for an extract (cold brew) obtained using an apparatus according to comparative Example 1.

Referring to FIG. 4, a high draw-off (Kg/Kg), i.e. a high mass rate of extract to coffee results in a high overall extraction yield and low extract soluble solids content (%) of the cold brew.

Higher extraction yields are achievable if equilibrium conditions have not been reached. Furthermore, the ground size (mm) of the Roast and Ground coffee loaded into the column can also influence the overall yield (wt. %): the finer is the ground size the higher is the extraction yield and the higher is the soluble solids content (wt. %).

Comparative Example 2 (Prior Art)

Experimental Conditions and Apparatus Set-Up
Apparatus Configuration: 1-stage stirred slurry tank extractor
Coffee blend: 100% *arabica* coffee (*Coffea arabica* L.)
Roasting Degree (Probat Colorette 3B): Medium Roast
Coffee ground size: 0.25 mm
Fines separation (<0.6 mm): yes
Ground coffee load: 14.40 kg
Extraction time: 40 min
Feed water temperature: 30° C.
Water to coffee ratio: 8:1
The graph of FIG. 5 represents an overall extraction yield (wt. %) and/or extract soluble solids (wt. %) plotted against the extraction time (minutes) for an extract (cold brew) obtained by a 1-stage stirred slurry tank extractor process of the prior art, as for Comparative Example 2.

Figure 5:
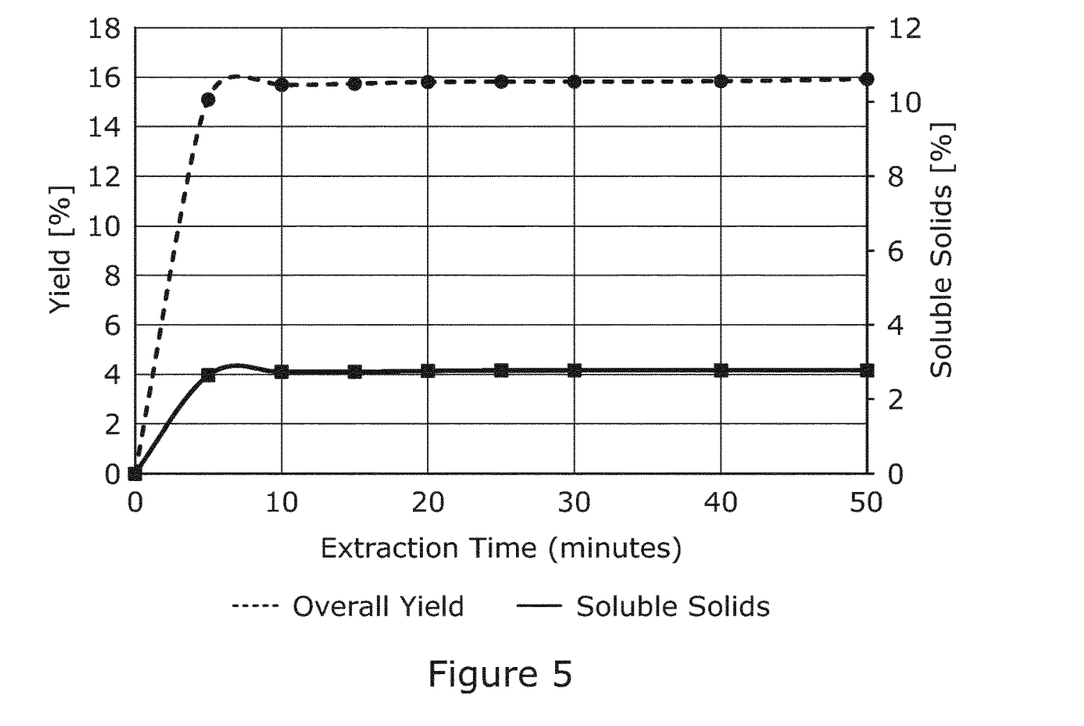
FIG. 5 illustrates a graph of an overall extraction yield (wt. %) and/or an extract soluble solids content (wt. %) plotted against extraction time (minutes) according to Comparative Example 2 using an apparatus and method of the Prior Art.

Referring to FIG. 5, a decreased ground size was used compared to the one in Comparative Example 1. This enables an increase of the overall extraction yield (wt. %) which allows equilibrium conditions to be attained within the 40-minute process, resulting in an overall extraction yield of around 15 wt. % and a soluble solids content of the extract of less than 3.0% wt. Furthermore, it is noticeable the fact that a lower overall yield (wt. %) in FIG. 5, compared to the fixed bed single column extractor of Comparative Example 1 (FIG. 4), results into a comparable soluble solids content of the resulted extract, particularly <3.0% wt.

Example 3 (of the Invention)

Experimental Conditions and Apparatus Set Up:
Apparatus Configuration: apparatus of the invention with a single extraction chamber in the form of a column (as shown in FIG. 1, and as described above)
Coffee blend: 70% robusta (*Coffea canephora*) and 30% arabica coffee (*Coffea arabica* L.)
Roasting Degree (Probat Colorette 3B): Medium Roast
Coffee ground size: 1.4 mm Fines separation (<0.6 mm): no
Ground coffee load: 32 kg
Extraction time: 44 min cycle times
Lower temperature cycles number (Stage 1): 5
Higher temperature cycles number (Stage 2): 2
Feed water temperature for lower temperature cycles (Stage 1): 20° C.
Feed water temperature for higher temperature cycles (Stage 2): 150-170° C.
Water to coffee ratio: 4:1

Example 4 (of the Invention)

Experimental Conditions and Apparatus Set Up:
Apparatus Configuration: apparatus of the invention with a single extraction chamber in the form of a column (as shown in FIG. 1, and as described above)
Coffee blend: 70% robusta (*Coffea canephora*) and 30% arabica coffee (*Coffea arabica* L.)
Roasting Degree (Probat Colorette 3B): Medium Roast Coffee ground size: 1.2 mm Fines separation (<0.6 mm): no Ground coffee load: 32 kg
Extraction time: 44 min cycle times
Lower temperature cycles number (Stage 1): 4
Higher temperature cycles number (Stage 2): 2
Feed water temperature for lower temperature cycles (Stage 1): 20° C.
Feed water temperature for higher temperature cycles (Stage 2): 150-170° C.
Water to coffee ratio: 4:1

Example 5 (of the Invention)

Experimental Conditions and Apparatus Setup:
Apparatus Configuration: apparatus of the invention with a single extraction chamber in the form of a column (as shown in FIG. 1, and as described above) Coffee blend: 70% robusta (*Coffea canephora*) and 30% arabica coffee (*Coffea arabica* L.)
Roasting Degree (Probat Colorette 3B): Medium Roast
Coffee ground size: 1.0 mm
Fines separation (<0.6 mm): no Ground coffee load: 32 kg
Extraction time: 44 min cycle times
Lower temperature cycles number (Stage 1): 4
Higher temperature cycles number (Stage 2): 2
Feed water temperature for lower temperature cycles (Stage 1): 20° C.
Feed water temperature for higher temperature cycles (Stage 2): 150-170° C.
Water to coffee ratio: 4:1
The graph of FIG. 6 represents an overall extraction yield (wt. %) plotted against the extraction time (minutes) for the three extracts obtained with the apparatus according to the invention of Example 3 (line labelled Trial 1), Example 4 (line labelled Trial 2) and Example 5 (line labelled Trial 3).

Figure 6:
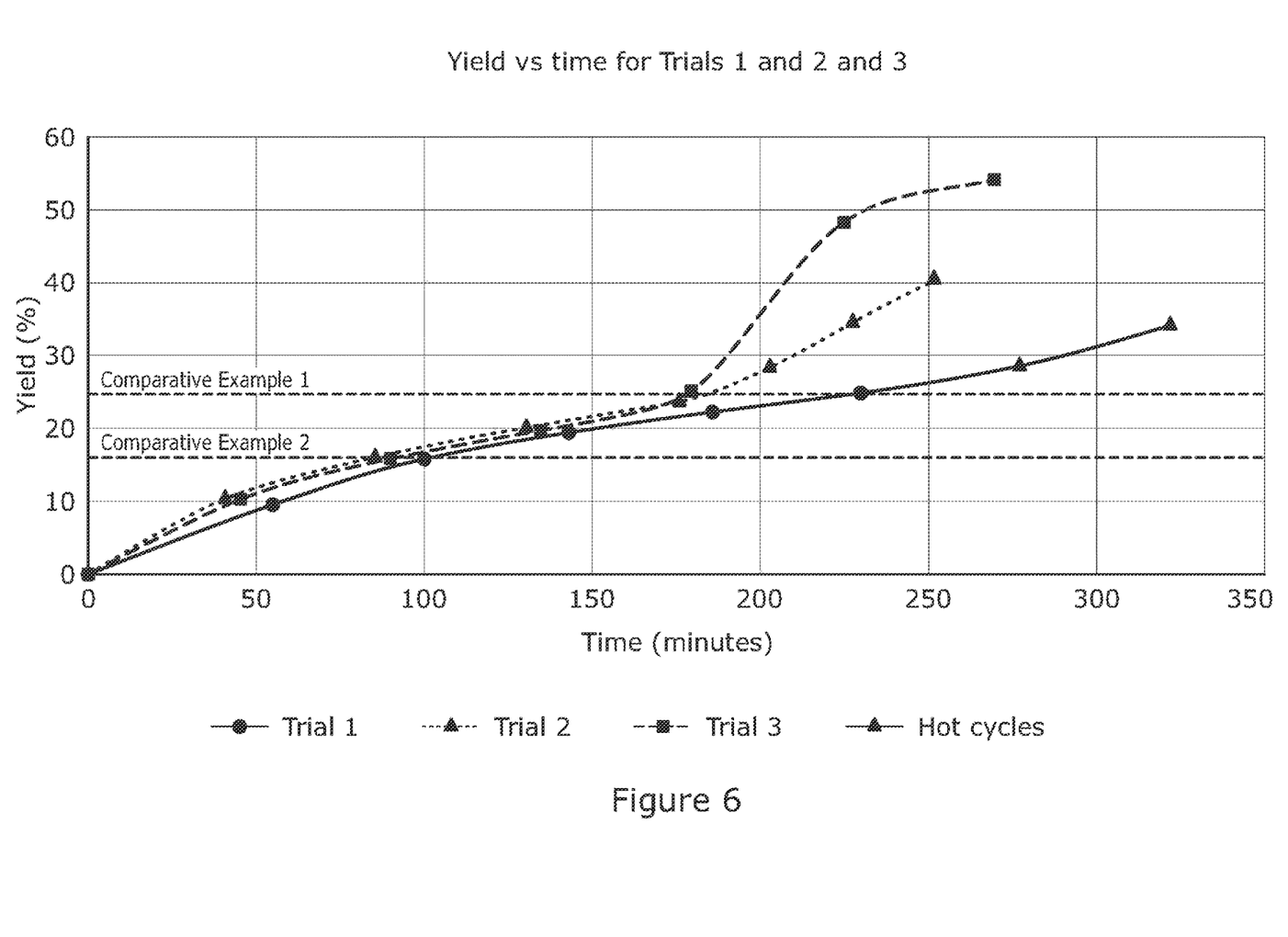
FIG. 6 illustrates a graph of an overall extraction yield (wt. %) plotted against extraction times (minutes) using an embodiment of the methods and the apparatus according to the invention as described in Examples 3, 4 and 5.

Referring to FIG. 6, it is noticeable that the overall extraction yields (wt. %) for Trial 1, 2, 3, at a Stage 1 (low temperature of extraction) are higher than the yield of the extraction carried out in the apparatus of the Prior Art as for Comparative Example 2 (FIG. 5), even though the extraction of Trial 1, 2, 3 are carried out at lower temperature than the temperature of Comparative Example 2 (dotted line labelled 'Comparative Example 2').

The resultant overall extraction yield (wt. %) is even higher if the corresponding hot cycles for Trial 1, 2, 3 (at high temperature, Stage 2) are taken into account (portion on lines labelled 'Hot cycles').

The overall extraction yields (wt. %) for Trial 1, 2, 3 at Stage 1 (low temperature) is comparable to the yield of the extract obtained with the apparatus of the Prior Art as for Comparative Example 1 (dotted line labelled 'Comparative Example 1). However, in Examples 3, 4 and 5 the resultant overall extraction yield (wt. %) is higher if the corresponding hot cycles for Trial 1, 2, 3 (at high temperature, Stage 2) are taken into account (portion on lines labelled 'Hot cycles').

Significantly, the extraction using the apparatus and methods of Examples 3, 4 and 5 do not require any filtration post extraction unlike the Comparative Examples.

Using the method of the invention a skilled person is able to create extracts with different sensorial attributes which then be combined adding during the method or after the method is completed as opposed to the comparative examples using a single stage temperature to produce uniform extract (Comparative Example 1 and 2).

Example 6 (of the Invention)

Apparatus Configuration: apparatus of the invention with a two extraction chambers configuration, in the form of two columns (as shown in FIG. 2, and as described above). Other experimental conditions are as described in Experiment 5.

Fresh water is sent through the pipes system to the extraction fluid inlet (305) at 20° C. The fresh water passing through the extraction fluid inlet (305) reaches the roast and ground coffee and travels in counter current through the column (303) performing the extraction of soluble solids and volatile aroma compounds (VOCs), generating the extract which is then sent to a further extraction process through the extract outlet (307) positioned at the upper area of the first column (203). The extract is conveyed into the extract inlet (205) of the second column (203) and reaches the roast and ground coffee therein. The extract passing through the coffee material (209) dissolves further soluble compounds contained in the coffee powder (209) and generates an enriched extract which is transported to the enriched extract outlet (207) to be then collected and sent to further industrial processes, such as concentration and/or dilution and/or spray or freeze drying etc.

After having performed the first extraction cycle at 20° C. (Stage 1) and having obtained the enriched extract, the apparatus is set, through the heating element (15), at a higher temperature and fresh water, at a temperature in the range of 150° C. and 170° C., is transported to the first column (303), (filled with partially extracted roast and ground coffee (309)). A secondary extract is produced from the first column (303) at the second temperature and collected at the top of the column (303) to be conveyed through the extract outlet (307) and then the enriched extract inlet (205) to the second column (203). The secondary extract reaches the coffee powder (209), already partially extracted during Stage 1 at 20° C., to generate the enriched secondary extract which is then send to further industrial processes like concentration and/or dilution and/or spray or freeze drying etc.

Example 7 (of the Invention)

Experiment Conditions and Apparatus Setup:
Apparatus Configuration: apparatus of the invention with a single extraction chamber in the form of a column (as shown in FIG. 1, and as described above) and recirculation of the extract through the extraction chamber. Other experimental conditions are as described in Example 5.

The resultant extract showed improved sensorial attributes, but the process lead to decreased yields compared to Example 5 where the use of fresh water at every cycle enables a higher yield.

Clauses

The following clauses are included to at least partially define some aspects of the invention.
1. A method of extracting a beverage material comprising the steps of
   a) at least partially filling a first extraction chamber with an extractable beverage material;
   b) conveying at least one extraction fluid through at least said first extraction chamber to provide an extract;
   c) modifying said extraction fluid temperature before conveying extraction fluid through at least said first extraction chamber at a second extraction temperature to provide a secondary extract;
2. A method according to clause 1 comprising before step c) further steps of:
   d) conveying at least part of said extract back into said first extraction chamber to provide an enriched extract; and/or
   e) collecting said enriched extract.
3. A method according to clause 1 or 2 further comprising a step f) of conveying said secondary extract at the second extraction temperature through said first extraction chamber to provide an enriched secondary extract.
4. A method according to any one of clauses 1 to 3 wherein the first extraction temperature is lower than the second extraction temperature.
5. A method according to any one of clauses 1 to 4 wherein the extract produced in step b) and/or d) has a temperature lower than the extract produced in step c) and/or f).
6. A method according to any one of clauses 1 to 5 wherein the first extraction temperature is in the range of 10° C. and 35° C.
7. A method according to any one of clauses 1 to 6 wherein the first extraction temperature is no more than ambient temperature, preferably no more than 25° C.
8. A method according to any one of clauses 1 to 7 wherein the first extraction temperature is no more than 23° C.
9. A method according to any one of clauses 1 to 8 wherein the second extraction temperature is in the range of 100° C. to 220° C.
10. A method according to any one of clauses 1 to 9 wherein the second extraction temperature is no more than 170° C.
11. A method according to any one of clauses 1 to 10 wherein said at least one extraction chamber comprises a column.
12. A method according to any one of clauses 1 to 11 wherein steps d) and/or f) are repeated at least once.
13. A method according to any preceding clause wherein said extractable beverage material comprises coffee.
14. A method according to any preceding clause wherein said extraction fluid comprises water.
15. A method according to clause 14 wherein said water comprises a fluid flow rate in step b) and/or c) in the range of 18 to 25 Kg/h, preferably 20 kg/h.
16. A method according to clause 14 or 15 when dependent on clause 2 and/or 3 wherein said water comprises a fluid flow rate of steps d and/or f) in the range of 10 to 20 Kg/h, preferably 18 kg/h.
17. A method according to any preceding clause wherein the extraction fluid is conveyed through the extractable beverage material against gravity.
18. A method according to any preceding clause wherein the extraction fluid to extractable beverage material ratio comprises values in the range of 2.5 to 6.
19. A method of extracting a beverage material comprising the steps of
   a) at least partially filling a first extraction chamber with an extractable beverage material;
   b) conveying at least one extraction fluid at a first extraction temperature through the extractable beverage material in the first extraction chamber to provide an extract;
   c) conveying said extract at the first extraction temperature through at least a second extraction chamber at least partially filled with an extractable beverage material to provide an enriched extract;
   d) modifying said extraction fluid temperature before conveying extraction fluid through the extractable beverage material in the first extraction chamber at a second extraction temperature to provide a secondary extract;
20. A method according to clause 19 further comprising a step e) of conveying said secondary extract at the second extraction temperature through at least the second extraction chamber to provide an enriched secondary extract.
21. A method according to clause 19 or 20 wherein the first extraction temperature is lower than the second extraction temperature.
22. A method according to any one of clauses 19 to 21 wherein the extract produced in step b) and/or c) has a temperature lower than the extract produced in step d) and/or e).
23. A method according to any one of clauses 19 to 22 wherein the first extraction temperature comprises values of temperature in the range of 10° C. and 35° C.
24. A method according to any one of clauses 19 to 23 wherein the first extraction temperature is no more than ambient temperature, preferably no more than 25° C.
25. A method according to any one of clauses 19 to 24 wherein the first extraction temperature is no more than 23° C.
26. A method according to any one of clauses 19 to 25 wherein the second extraction temperature comprises values in the range of 100° C. to 220° C.

27. A method according to clause 26 wherein the second extraction temperature is no more than 170° C.
28. A method according to any one of clauses 19 to 27 wherein steps b) and/or c) are repeated at least once before step d) is performed.
29. A method according to clause 28 wherein steps b) and/or c) are repeated at least twice before step d) is performed.
30. A method according to any one of clauses 19 and 28 comprising a further step after step c) of conveying the enriched extract through at least a third extraction chamber at least partially filled with a extractable beverage material.
31. A method according to clause 30 wherein the extract of step b) is conveyed through the third and each of all the consequent extraction chambers.
32. A method according to any one of clauses 19 to 31 wherein step d) is repeated once.
33. A method according to any one of clauses 19 to 32 wherein said at least one extraction chamber comprises a column.
34. A method according to any one of clauses 19 to 33 wherein said all the extraction chambers comprise columns.
35. A method according to any one of clauses 19 to 34 wherein after performing steps a), b), c) and d) at least once, fresh extraction fluid is added to an extract produced by one of steps a), b), c) and d).
36. A method according to any one of clauses 19 to 35 wherein the extract coming from step b) and/or c) and/or d) is diluted with fresh extraction fluid.
37. A method according to clause 36 wherein said extract to said added fresh extraction fluid ratio is in the range between 0% and 100%, preferably 50%.
38. A method according to any one of clauses 19 to 37 comprising a further step f) of emptying said at least first extraction column of extractable beverage material after step d) or e).
39. A method according to clause 38 comprising further steps of:
  g) loading said emptied column with fresh extractable beverage material; and
  h) providing said extractable beverage material with said enriched extract at the first extraction temperature.
40. A method according to clause 39 wherein said enriched extract is diluted before step h).
41. A method according to any one of clauses 19 to 40 wherein after step b) at least some of said extract is recirculated back to the first extraction chamber at the first extraction temperature before moving to step c).
42. A method according to any one of clauses 19 to 41 wherein after step c) said enriched extract is at least partially recirculated through each of the subsequent extraction chambers.
43. An extraction apparatus comprising one or more extraction chambers each configured to retain an extractable beverage material during an extraction process; an extraction fluid inlet at the bottom of each extraction chamber configured to introduce an extraction fluid through the extractable beverage material; an extract outlet at the top of each extraction chamber configured to remove an extract from the extractable beverage material; and wherein the apparatus further comprises a heating element configured to independently modify of the temperature of at least some of the extraction fluid passing through each extraction chambers.
44. An extraction apparatus according to clause 43 wherein said extractable beverage material within each extraction chamber is at least partially configured as a fixed bed.
45. An extraction apparatus according to clause 44 comprising a fixed bed percolator.
46. An extraction apparatus according to clause 45 wherein said fixed bed percolator comprises a counter current fixed bed percolator.
47. An extraction apparatus according to clause 46 wherein said fixed bed percolator comprises a semi-continuous fixed bed percolator.
48. A method as defined in any one of clauses 1 to 42 using an apparatus as defined in any one of clauses 43 to 47.

The invention claimed is:

1. A method of extracting a beverage material comprising the steps of:
   a) at least partially filling a first extraction chamber with a first extractable beverage material, and at least partially filling a second extraction chamber with a second extractable beverage material that is fresher or less extracted than the first extractable beverage material;
   b) conveying at least one extraction fluid at a first extraction temperature through the extractable beverage material in the first extraction chamber to provide an extract;
   c) conveying said extract at the first extraction temperature through at least the second extraction chamber to provide an enriched extract;
   d) modifying said extraction fluid temperature before conveying the extraction fluid through the first extractable beverage material in the first extraction chamber at a second extraction temperature to provide a secondary extract.

2. A method according to claim 1 wherein said extractable beverage material comprises coffee.

3. A method according to claim 1 wherein said extraction fluid comprises water.

4. A method according to claim 1 wherein the extraction fluid is conveyed through the extractable beverage material against gravity.

5. A method according to claim 1 further comprising a step e) of conveying said secondary extract at the second extraction temperature through at least the second extraction chamber to provide an enriched secondary extract.

6. A method according to claim 1 wherein the first extraction temperature is lower than the second extraction temperature.

7. A method according to claim 1 wherein the first extraction temperature is in the range of 10° C. and 35° C.

8. A method according to claim 1 wherein the second extraction temperature is in the range of 100° C. to 220° C.

9. A method according to claim 1 wherein steps b) and/or c) are repeated at least once before step d) is performed.

10. A method according to claim 1 comprising a further step after step c) of conveying the enriched extract through at least a third extraction chamber at least partially filled with an extractable beverage material.

11. A method according to claim 10 wherein the extract of step b) is conveyed through the third and each of all subsequent extraction chambers.

12. A method according to claim 1 wherein after conveying the extraction fluid through the first extractable beverage material in the first extraction chamber at a second extraction temperature to provide a secondary extract in step d), the extraction fluid is conveyed through the first extractable beverage material in the first extraction chamber at the second extraction temperature again.

13. A method according to claim 1 wherein after performing steps a), b), c) and d) at least once, fresh extraction fluid is added to an extract produced by one of steps b), c) and d).

14. A method according to claim 1 wherein the extract coming from step b) and/or c) and/or d) is diluted with fresh extraction fluid.

15. A method according to claim 5 comprising a further step f) of emptying at least the first extraction column of extractable beverage material after step d) or e).

16. A method according to claim 15 comprising further steps of:
   g) loading said emptied column with fresh extractable beverage material; and
   h) providing said extractable beverage material with said enriched extract at the first extraction temperature.

17. A method according to claim 16 wherein said enriched extract is diluted before step h).

18. A method according to claim 1 wherein after step b) at least some of said extract is recirculated back to the first extraction chamber at the first extraction temperature before moving to step c).

19. A method according to claim 10 wherein after step c) said enriched extract is at least partially recirculated through each of the subsequent extraction chambers.

20. A method as claimed in claim 1 using an extraction apparatus comprising at least a first extraction chamber and a second extraction chamber, each extraction chamber configured to retain an extractable beverage material during an extraction process; an extraction fluid inlet at the bottom of each extraction chamber configured to introduce an extraction fluid through the extractable beverage material; an extract outlet at the top of each extraction chamber configured to remove an extract from the extractable beverage material; and wherein the apparatus further comprises a heating element configured to independently modify the temperature of at least some of the extraction fluid passing through each extraction chambers, wherein the second extraction chamber contains a fresher or less extracted beverage material, compared to the one in the first extraction chamber.

* * * * *